United States Patent
Ishikawa (10) Patent No.: US 7,473,718 B2
(45) Date of Patent: *Jan. 6, 2009

(54) ACTINIC RAY CURABLE COMPOSITION, AND ACTINIC RAY CURABLE INK AND IMAGE FORMING METHOD BY USE THEREOF

(75) Inventor: Wataru Ishikawa, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 418 days.

This patent is subject to a terminal disclaimer.

(21) Appl. No.: 11/155,089

(22) Filed: Jun. 17, 2005

(65) Prior Publication Data

US 2005/0288386 A1 Dec. 29, 2005

(30) Foreign Application Priority Data

Jun. 24, 2004 (JP) ............................. 2004-186173

(51) Int. Cl.
*C08G 65/02* (2006.01)
*C08G 65/06* (2006.01)
*C08G 65/18* (2006.01)

(52) U.S. Cl. .................. 522/31; 522/168; 528/417; 528/408

(58) Field of Classification Search .............. 522/31, 522/168; 528/408, 417
See application file for complete search history.

(56) References Cited

U.S. PATENT DOCUMENTS

| | | | | |
|---|---|---|---|---|
| 6,805,439 | B2 * | 10/2004 | Maeda et al. | 347/96 |
| 6,846,074 | B2 * | 1/2005 | Hirai | 347/102 |
| 6,866,376 | B2 * | 3/2005 | Maeda et al. | 347/100 |
| 6,874,870 | B2 * | 4/2005 | Ishikawa et al. | 347/68 |
| 6,910,764 | B2 * | 6/2005 | Nakajima | 347/102 |
| 6,951,376 | B2 * | 10/2005 | Ishikawa | 347/11 |
| 6,959,986 | B2 * | 11/2005 | Ushirogouchi et al. | 347/100 |
| 7,056,559 | B2 * | 6/2006 | Nakajima et al. | 427/466 |
| 7,059,710 | B2 * | 6/2006 | Ishikawa | 347/68 |
| 7,119,130 | B2 * | 10/2006 | Sasa | 522/170 |
| 7,144,929 | B2 * | 12/2006 | Sasa | 522/170 |
| 7,182,453 | B2 * | 2/2007 | Nakajima | 347/102 |
| 7,244,473 | B2 * | 7/2007 | Takabayashi et al. | 427/466 |
| 2005/0190252 | A1 * | 9/2005 | Nishizeki et al. | 347/105 |
| 2005/0215657 | A1 * | 9/2005 | Nishizeki et al. | 522/31 |

* cited by examiner

*Primary Examiner*—Susan W Berman
(74) *Attorney, Agent, or Firm*—Lucas & Mercanti, LLP (57) ABSTRACT

An actinic ray curable composition is disclosed, comprising and oxetane ring-containing compound and an epoxy compound, in which the oxetane ring-containing compound comprises a compound containing a single oxetane ring and a compound containing at least two oxetane rings, and the compound containing a single oxetane ring accounting for 1% to 20% by weight if the composition. There are also disclosed an ink for use in ink jet printing and an image forming method by use thereof.

19 Claims, 2 Drawing Sheets

ACTINIC RAY CURABLE COMPOSITION, AND ACTINIC RAY CURABLE INK AND IMAGE FORMING METHOD BY USE THEREOF

This application claims priority from Japanese Patent Application No. JP2004-186173 filed on Jun. 24, 2004, which is incorporated hereinto by reference.

FIELD OF THE INVENTION

The present invention relates to an actinic ray curable composition and in particular to an actinic ray curable composition which exhibits a relative low viscosity and is curable at a high sensitivity, forming a coating of superior adhesion and hardness, and an actinic ray ink, an image forming method and an ink recording apparatus by use thereof.

BACKGROUND OF THE INVENTION

A curable composition which is curable upon exposure to actinic rays such as ultraviolet rays or an electron beams, or heat has been utilized in various uses for paints for plastics, paper, woodwork and inorganic materials, adhesives, printing inks, printed circuit boards and electric insulators. Recently, further improvement in weather resistance and adhesiveness has been desired, specifically in printing inks, paints and adhesives. As an ink jet ink employing these, there are known ultraviolet ray curable ink jet inks. Also recently, an ink jet system employing these ultraviolet ray curable inks has been noted in terms of relatively low odor, high-speed drying and being recordable onto a recording medium having no ink absorptivity. There is disclosed ultraviolet ray curable ink jet ink, for example, in JP-A No. 6-200204 (hereinafter, the term JP-A refers to Japanese Patent Application Publication) and published Japanese translation-of PCT international publication for patent application No. 2000-504778. There has been desired, in this field, formation of a strong and soft film of superior adhesion as well as low viscosity.

Further, when using these inks, curing sensitivity is relatively easily variable, depending on the kind of recording material and working environment.

An ink using a radical polymerizable compound is subject to an oxygen-inhibiting action, tending to cause curing inhibition at a relatively low ink droplet amount. Contrary to that, an ink using a cation-polymerizable compound is not subject to such oxygen inhibition, in fact exhibiting no curing inhibition even at a relatively low droplet amount and then enabling printing of precise images. However, inks employing cation-polymerizable compounds, as described in JP-A Nos. 2001-220526, 2002-188025, 2002-317139 and 2003-55449 have problems of being easily affected by moisture (humidity) at the molecular level.

SUMMARY OF THE INVENTION

The present invention has been achieved in view of the foregoing. Accordingly, it is an object of the invention to provide an actinic ray curable ink exhibiting a relatively low viscosity and high curing sensitivity, capable of forming a strong and soft film even under various environments, and an actinic ray curable ink, an image forming method and an ink jet recording apparatus by use thereof.

The foregoing problems can be overcome by the following constitution.

Thus, in one aspect the invention is directed to an actinic ray curable composition comprising photopolymerizable compounds including an oxetane ring-containing compound and an epoxy compound, wherein the oxetane ring-containing compound comprises a compound (O-1) containing a single oxetane ring and a compound (O-2) containing at least two oxetane rings, and the compound (O-1) accounting for from 1% to 20% by weight, based on the actinic ray curable composition.

In another aspect the invention is directed to an actinic ray curable ink comprising the composition described above and a pigment.

Further in another aspect the invention is directed to an image forming method by use of the ink described above.

DETAILED DESCRIPTION OF THE INVENTION

There are used a compound (O-1) containing a single oxetane ring and a compound (O-2) containing at least two oxetane rings as an oxetane ring-containing compounds in the actinic ray curable composition of the invention.

Any compound which contains a single oxetane ring in the molecule is usable as the compound (O-1) containing a single oxetane ring and a compound represented by the following formula (Ox-1) is preferred:

formula (Ox-1)

wherein $R^1$ to $R^6$ are each a hydrogen atom or a substituent, provided that at least one of $R^3$, $R^4$, $R^5$ and $R^6$ is a substituent. Examples of a substituent of $R^1$ to $R^6$ include a fluorine atom, an alkyl group having 1 to 6 carbon atoms (e.g., methyl, ethyl, propyl, butyl), a fluoroalkyl group, an aryl group (e.g., phenyl, naphthyl), a furyl group or a thienyl group, which may be substituted. The compound (O-1) containing a single oxetane ring, used in the invention is preferably an oxetane compound containing a substituent at the 2-position of the oxetane ring and incorporated preferably in an amount of from 1% to 20% (preferably from 1% to 10%) by weight, based on the actinic ray curable composition.

Any compound which contains at least two oxetane ring in the molecule is usable as the compound (O-2) containing at least two oxetane rings and a compound represented by the following formula (Ox-2) is preferred:

formula (Ox-2)

wherein $R^{11}$ to $R^{16}$ are each a hydrogen atom or a substituent, provided that one of $R^{13}$, $R^{14}$, $R^{15}$ and $R^{16}$ is a single bond; n0 is an integer of 2 or more; and L is a n0-valent linkage group.

The expression, one of $R^{13}$ to $R^{16}$ being a single bond means that the oxetane ring is linked to the L by the single bond.

Examples of a linkage group include a hydrocarbon group and the hydrocarbon group which is linked (or interrupted) by =O—, —S—, —SO—, —SO$_2$—, —N= or —CO—. Examples of a substituent of $R^{11}$ to $R^{16}$ include a fluorine atom, an alkyl group having 1 to 6 carbon atoms (e.g., methyl, ethyl, propyl, butyl), a fluoroalkyl group, an aryl group (e.g., phenyl, naphthyl), a furyl group or a thienyl group, which may be substituted. A plurality of $R^{11}$ to $R^{16}$ may be the same or different. The compound (O-2) containing at least two oxetane rings is preferably an oxetane compound containing a substituent at the 2-position.

Specific examples of a preferred oxetane compound are shown below.

E-1

E-2

E-3

E-4

E-5

E-6

E-7

E-8

E-9

E-10

E-11

E-12

E-13

E-14

Next an epoxy compound used in the invention will be described.

Any compound containing an oxirane ring in the molecule is usable as the epoxy compound of the invention, and an alicyclic epoxy compound, or an epoxydized fatty acid ester or epoxydized fatty acid glyceride is preferred.

In the invention, the alicyclic epoxy compound is preferably represented by the following formulas (A), and more preferably by the following formulas (I) to (VI):

formula (A)

wherein $R_{100}$ and $R_{110}$ are each a substituent; m01 and m02 are each an integer of 0 to 2; r0 is an integer of 1 to 3; $L_0$ is a (r0+1)-valent linkage group having 1 to 15 carbon atoms or a single bond in which the linkage group optionally contains an oxygen atom or a sulfur atom in the main chain;

formula (I)

wherein $R_{101}$ and $R_{111}$ are each a substituent; m11 and m12 are each an integer of 0 to 2, and r1 is an integer of 1 to 3; $L_1$ is a (r1+1)-valent linkage group having 1 to 15 carbon atoms or a single bond in which the linkage group optionally contains an oxygen atom or a sulfur atom in the main chain;

formula (II)

wherein $R_{102}$ and $R_{112}$ are each a substituent; m21 and m22 are each an integer of 0 to 2, and r2 is an integer of 1 to 3; $L_2$ is a (r2+1)-valent linkage group having 1 to 15 carbon atoms or a single bond in which the linkage group optionally contains an oxygen atom or a sulfur atom in the main chain;

formula (III)

wherein $R_{200}$ and $R_{210}$ are each an aliphatic group locating at a position other than α- or β-position of an oxirane ring; m31 and m32 are each an integer of 0 to 2; $X_1$ and $X_{11}$ are each $—(CH_2)_{n0}—$ or $—(O)_{n0}—$ in which n0 is 0 or 1 and n0 may be the same or different; p1 and q1 are each 0 or 1, provided that p1 and q1 are not 0 at the same time; r3 is an integer of 1 to 3; $L_3$ is a (r3+1)-valent linkage group having 1 to 15 carbon atoms and a branching structure or a single bond in which the linkage group optionally contains an oxygen atom or a sulfur atom in the main chain;

formula (IV)

wherein $R_{201}$ and $R_{211}$ are each an aliphatic group locating at a position other than α- or β-position of an oxirane ring; m41 and m42 are each an integer of 0 to 2; $X_1$ and $X_{11}$ are each $—(CH_2)_{n1}—$ or $—(O)_{n1}—$ in which n1 is 0 or 1 and n0 may be the same or different; p2 and q2 are each 0 or 1, provided that p2 and q2 are not 0 at the same time; r4 is an integer of 1 to 3; $L_4$ is a (r4+1)-valent linkage group having 1 to 15 carbon atoms and a branching structure or a single bond in which the linkage group optionally contains an oxygen atom or a sulfur atom in the main chain.

In the foregoing formulas, $R_{100}$, $R_{110}$, $R_{101}$, $R_{111}$, $R_{102}$, $R_{112}$, $R_{200}$, $R_{210}$, $R_{201}$, and $R_{211}$ are each a substituent. Examples of a substituent include a halogen atom (e.g., chlorine atom, bromine atom, fluorine atom), an alkyl group having 1 to 6 carbon atoms (e.g., methyl, ethyl, propyl, isopropyl, butyl), an alkoxy group having 1 to 6 carbon atoms (methoxy, ethoxy, n-propoxy, iso-propoxy, n-butoxy, tert-butoxy), an acyl group (e.g., acetyl, propionyl, trifluoroacetyl), an acyloxy group (e.g., acetoxy, propionyloxy, trifluoroacetoxy), and an alkoxycarbonyl group (e.g., methoxycarbonyl, ethoxycarbonyl, tert-butoxycarbonyl). Of these, an alkyl group, an alkoxy group and an alkoxycarbonyl group are preferred as a substituent. Further, m01, m02, m11, m12, m21, m22, m31, m32, m41, and m42 are each an integer of 0 to 2, preferably 0 or 1.

$L_0$ is a (r0+1)-valent linkage group having 1 to 15 carbon atoms or a single bond in which the linkage group optionally contains an oxygen atom or a sulfur atom in the main chain; $L_1$ is a (r1+1)-valent linkage group having 1 to 15 carbon atoms or a single bond in which the linkage group optionally contains an oxygen atom or a sulfur atom in the main chain; $L_2$ is a (r2+1)-valent linkage group having 1 to 15 carbon atoms or a single bond in which the linkage group optionally contains an oxygen atom or a sulfur atom in the main chain; $L_3$ is a (r3+1)-valent linkage group having 1 to 15 carbon atoms or a single bond in which the linkage group optionally contains an oxygen atom or a sulfur atom in the main chain; and $L_4$ is a (r4+1)-valent linkage group having 1 to 15 carbon atoms or a single bond in which the linkage group optionally contains an oxygen atom or a sulfur atom in the main chain.

Examples of a bivalent linkage group having 1 to 15 carbon atoms which may contain an oxygen atom or a sulfur atom in the main chain include the following groups, which may be combined with groups of $—O—$, $—S—$, $—CO—$ and $CS—$: methylene group $[—CH_2—]$, ethylidene group $[>CH2CH_3]$, isopropylidene $[>C(CH_3)_2]$, 1,2-ethylene group $[—CH2CH_2—]$, 1,2-propylene group $[—CH(CH_3)CH_2—]$, 1,3-propanediyl group $[—CH_2CH_2CH_2—]$, 2,2-dimethyl-1,3-propanediyl group $[—CH_2C(CH_3)_2CH_2—]$, 2,2-dimethoxy-1,3-propanediyl group $[—CH_2C(OCH_3)_2CH_2—]$, 2,2-dimethoxy-1,3-propanediyl group $[—CH2C(CH_2OCH_3)_2CH_2—]$, 1-methyl-1,3-propanediyl group $[—CH(CH_3)CH_2CH_2—]$, 1,4-butanediyl group $[—CH_2CH_2CH_2CH_2—]$, 1,5-pentanediyl group $[—CH_2CH_2CH_2CH_2CH_2—]$, oxydiethylene group $[—CH_2CH_2OCH_2CH_2—]$, thiodiethylene group $[—CH_2CH_2SCH_2CH_2—]$, 3-oxothiodiethylene group $[—CH_2CH_2SOCH_2CH_2—]$, 3,3-dioxothiodiethylene group $[—CH_2CH_2SOCH_2CH_2—]$, 1,4-dimethyl3-oxa-1,5-pentanediyl $[—CH(CH_3)CH_2OCH(CH_3)CH_2—]$, 3-oxopentanediyl group $[—CH_2CH_2COCH_2CH_2—]$, 1,5-dioxo-3-oxapantanediyl group $[—COCH_2OCH_2CO—]$, 4-oxa-1,7-heptanediyl group $[—CH_2CH_2CH_2OCH_2CH_2CH_2—]$, 3,6-dioxa-1,8-octanediyl group $[—CH_2CH_2OCH_2CH_2OCH_2CH_2—]$, 1,4,7-trimethyl-3,6-dioxa-1,8-octanediyl group $[—CH(CH_3)CH_2OCH(CH_3)CH_2OCH(CH_3)CH_2—]$, 5,5-dimethyl-3,7-dioxa-1,9- nonanediyl group [—CH₂CH₂OCH₂C(CH₃)CH₂OCH₂CH₂—], 5,5-dimethoxy-3,7-dioxa-1,9-nonanediyl group [—CH₂CH₂OCH₂C(OCH₃)₂CH₂OCH₂CH₂—], 5,5-dimethoxymethyl-3,7-dioxa-1,9-nonanediyl group [—CH₂CH₂OCH₂C(CH₂OCH₃)₂CH₂OCH₂CH₂—], 4,7-dioxo-3,8-dioxa-1,10-decanediyl group [—CH₂CH₂OCOCH₂CH₂CO—OCH₂CH₂—], 3,8-dioxo-4,7-dioxa-1,10-decanediyl group [-CH₂CH₂COOCH₂CH₂O-COCH₂CH₂-], 1,3-cyclopentanediyl group [-1,3-C₅H₈—], 1,2-cyclohexanediyl group [-1,2-C₆H₁₀—], 1,3-cyclohexanediyl group [-1,3-C₆H₁₀—], 1,4-cyclohexanediyl group [-1,4-C₆H₁₀—], 2,5-tetrahydrofurandiyl [2,5-C₄H₆O—], p-phenylene group [-p-C₆H₄—], m-phenylene group [-m-C₆H₄—], α,α'-o-xylilene group [-o-CH₂—C₆H₄—CH₂—], α,α'-m-xylilene group [-m-CH₂—C₆H₄—CH₂—], α,α'-p-xylilene group [-p-CH₂—C₆H₄—CH₂—], furan-2,5-diyl-bismethylene group [2,5-CH₂—C₄H₂O—CH₂—], thiophene-2,5-diyl-bismethylene group [2,5-CH₂—C₄H₂S—CH₂—], and isopropylidene-bis-p-phenylene group [-p-C₆H₄—C(CH₃)₂-p-C₆H₄—].

Further, a tri-valent or more valent linkage group (i.e., linkage group having three or more valency) is a group which is formed by removing necessary hydrogen atom(s) at any position of the foregoing bivalent linkage group or a group formed by combining the foregoing group with at least one group selected from —O—, —S—, —CO— and —CS— groups.

$L_0$, $L_1$, $L_2$, $L_3$ and $L_4$ may be substituted and examples of a substituent include a halogen atom (e.g., fluorine atom, chlorine atom, bromine atom, iodine atom), an alkyl group having 1 to 6 carbon atoms (e.g., methyl, ethyl, propyl, isopropyl, butyl), an alkoxy group having 1 to 6 carbon atoms (e.g., methoxy, ethoxy, n-propoxy, iso-propoxy, n-butoxy, tert-butoxy), an acyl group (e.g., acetyl, propionyl, trifluoroacetyl), an acyloxy group (e.g., acetoxy, propionyloxy, trifluoroacetoxy), and an alkoxycarbonyl group (e.g., methoxycarbonyl, ethoxycarbonyltert-butoxycarbonyl). Of these substituents, a halogen atom, an alkyl group and an alkoxy group are preferred. Of these, an alkyl group, an alkoxy group and an alkoxycarbonyl group are preferred as a substituent. $L_0$, $L_1$, $L_2$, $L_3$ and $L_4$ are each preferably a bivalent linkage group having 1 to 8 carbon atoms which may contain an oxygen atom or a sulfur atom in the main chain, and more preferably a bivalent linkage group having 1 to 5 carbon atoms which may contain an oxygen atom or a sulfur atom in the main chain.

$X_1$ and $X_{11}$ are each —$(CH_2)_{n0}$ or —$(O)_{n0}$—, and $X_2$ and $X_{21}$ are each —$(CH_2)_{n1}$ or —$(O)_{n10}$—; n0 and n1 are each 0 or 1, provided that plural n0s or n1s may be the same or different (or when n0 and n1 are 1, $X_1$ and $X_{11}$, or $X_2$ and $X_{21}$ may be the same or different), and any of n1 and n0 being zero means that any one of $X_1$, $X_{11}$, $X_2$ and $X_{21}$ is not present; m31+n0, m32+n0, m41+n1 and m42+n1 are each preferably 1 or more.

Specific examples of a preferred alicyclic epoxy compound (or epoxide compound) are shown below but are not limited to these.

EP-1

-continued

EP-2

EP-3

EP-4

EP-5

EP-6

EP-7

EP-8

EP-9

The epoxy is contained preferably in an amount of 10% to 80% by weight, based on the total weight of the composition. When contained in an amount of less than 10% by weight, curability is markedly varied by a curing environment (such as temperature and humidity) and not acceptable in practical use. When contained in an amount of more than 80% by weight, physical properties of film become weak, and being unacceptable in practical use. The epoxy compounds may be use alone or in combination.

These alicyclic epoxy compounds can be synthesized with reference to for example, "Jikken-kagaku Koza (fourth edition) vol. 20, Yuki-gosei II, page 213 (1992, Maruzen KK); Ed. by Alfred Hasfner, The chemistry of heterocyclic compounds-Small Ring Heterocycles part 3 Oxiranes, John & Wiley and Sons, An Interscience Publication, New York, 1985; Yoshimura, Secchaku vol. 29 [12] 32 (1985); Yoshimura, ibid, vol. 30 [5] 42 (1986); Yoshimura, ibid, vol. 30 [7] 42 (1986); and JP-A Nos. 11-100378, 4-36263 and 4-69360.

There will be further described an epoxidized fatty acid ester and an epoxidized fatty acid glyceride used in the invention.

The use of an epoxidized fatty acid ester or epoxidized fatty acid glyceride in combination with an oxetane compound/alicyclic epoxy compound not only is preferable in terms of safety and environment such as AMES, sensitivity, skin irritation and odor but also solve problems such as occurrence of wrinkles due to shrinkage under curing environments (such as temperature and humidity) and defects in curability and ejectability. A content of more than 20% by weight results in insufficient strength of cured film.

In the invention, any fatty acid ester or any fatty acid glyceride which has been epoxidized is usable as an epoxidized fatty acid ester or epoxidized glyceride. An epoxidized fatty acid ester can be obtained, for example, by epoxidation of fatty acids, for example, oleic acid, and methyl epoxystearate, butyl epoxy stearate and octyl epoxystearate are also usable as the epoxidized fatty acid ester. An epoxidized fatty acid glyceride can be obtained by epoxidation of soybean oil, linseed oil or castor oil, and epoxidized soybean oil, epoxidized linseed oil or epoxidized castor oil is usable as the epoxidized fatty acid glyceride.

Next, a photolytically acid-generating agent will be described. The actinic ray curable composition of the invention preferably contains a photolytically acid-generating agent which is capable of generating an acid upon exposure to light.

The generated acid functions as an initiator of cationic polymerization of an oxetane compound and an epoxy compound. The photolytically acid-generating agent is preferably an onium salt generating no benzene upon exposure to an actinic ray. The expression, "generating no benzene upon exposure to an actinic ray" refers to generating substantially no benzene. Specifically, it refers to when a 15 mm thick image of approximately 100 m² is printed using an ink having an ink composition containing an onium salt (a photolytically acid-generating agent) of 5% by weight and the ink film surface is exposed to an actinic ray in a sufficient amount to decompose the photolytically acid-generating agent, maintained at 30° C., benzene-is produced in an extremely small amount of 5 μg or less, or nothing produced at all. The foregoing onium salt is preferably a sulfonium salt or an iodonium salt and a benzene ring having a substituent and bonded to $S^+$ or $I^+$, meets the foregoing condition. The sulfonium salt is preferably a sulfonium compound represented by the following formulas (1) to (4):

wherein $R_1$ to $R_{17}$ are each a hydrogen atom or a substituent, provided that $R_1$ to $R_3$ are not hydrogen atoms at the same time, $R_4$ to $R_7$ are not hydrogen atoms at the same time, $R_8$ to $R_{11}$ are not hydrogen atoms at the same time and $R_{12}$ to $R_{17}$ are not hydrogen atoms at the same time; X is non-nucleophilic anion residue.

In the foregoing formulas, $R_1$ to $R_{17}$ are each a hydrogen atom or a substituent, provided that $R_1$ to $R_3$ are not hydrogen atoms at the same time, $R_4$ to $R_7$ are not hydrogen atoms at the same time, $R_8$ to $R_{11}$ are not hydrogen atoms at the same time and $R_{12}$ to $R_{17}$ are not hydrogen atoms at the same time.

Preferred examples of the substituent of $R_1$ to $R_{17}$ include an alkyl group such as methyl, ethyl, propyl, isopropyl, butyl, isobutyl, t-butyl, pentyl or hexyl; an alkoxy group such as methoxy, ethoxy, propoxy, butoxy, hexyloxy, decyloxy or dodecyloxy; a carbonyl group such as acetoxy, propionyloxy, decylcarbonyloxy, dodecylcarbonyloxy, methoxycarbonyl, ethoxycarbonyl or benzoyloxy; a phenylthio group; a halogen atom such as fluorine, chlorine, bromine or iodine; nitro, cyano or hydroxy group.

In the formulas, X is a non-nucleophilic anion residue and examples thereof include a halogen atom such as F, Cl, Br, or I, $B(C_6F_5)_4$, $R_{18}COO$, $R_{19}SO_3$, $SbF_6$, $AsF_6$, $PF_6$, and $BF_4$, in which $R_{18}$ and $R_{19}$ are each an alkyl group such as methyl, ethyl, propyl or butyl, or an alkyl or phenyl group which may be substituted by a halogen atom such as fluorine, chlorine, bromine or iodine, nitro group, cyano group, or an alkoxy group such as methoxy or ethoxy. Of these, $B(C_6F_5)_4$ and $PF_6$ are preferred in terms of safety, and $PF_6$ is specifically preferred.

Similarly to photolytically acid-generating agents described in The Chemical Society of Japan Vol. 71, No. 11 (1998); Yuki Electronics Zairyo Kenkyukai ed., "Imaging-yo Yulizairyo" Bunshi-shuppan (1993), the foregoing compounds can readily be synthesized according to commonly known methods.

Specific examples of iodonium salts usable in the invention are shown below:

I-5

Specific examples of sulfonium salts usable in the invention are shown below S-1

S-1

S-2

S-3

S-4

S-5

S-6

S-7

S-8

S-9

S-10

Actinic Ray

In the ink jet recording method of the invention, an ink composition is adhered to a recording medium, followed by exposure to light. Exposure to light may be e visible light exposure or ultraviolet ray exposure, and ultraviolet exposure is preferred. The ultraviolet ray exposure is usually not less than 100 mJ/cm$^2$, preferably not less than 500 mJ/cm$^2$, and usually not more than 10,000 mJ/cm$^2$, preferably not more than 5,000 mJ/cm$^2$. An ultraviolet ray exposure falling within the foregoing range can complete curing reaction, thereby advantageously preventing fading of coloring agents, caused by ultraviolet ray exposure. Ultraviolet ray exposure can be achieved using a lamp such as a metal halide lamp, a xenon lamp, a carbon arc lamp, a chemical lamp, a low-pressure mercury lamp and a high-pressure mercury lamp. There may be used commercially available lamps, such as H-lamp, D-lamp and V-lamp, produced by Fusion System Corp.

Comparing a high-pressure mercury lamp (having a main peak at 365 nm), a metal halide lamp has a continuous spectrum, exhibiting a high emission efficiency in the range of 200 to 450 nm and being abundant in the longer wavelength region. Accordingly, in cases where an ink composition contains pigments similarly to the invention, a metal halide lamp is advantageously employed.

Coloring Material

Coloring material may be incorporated to color the actinic ray curable composition of the invention. Any coloring material which is soluble or dispersible in the main component of a polymeric compound is usable as coloring material for use in the composition of the invention and pigments are preferred in term of weather resistance. Preferred pigments usable in the invention are shown below:

C.I. Pigment Yellow-1, 3, 12, 13, 14, 17, 81, 83, 87, 95, 109, 42

C.I. Pigment Orange-16, 36, 38

C.I. Pigment Red-5, 22, 38, 48:1, 48:2, 48:4, 49:1, 53:1, 57:1, 63:1, 144, 146, 185, 101

C.I. Pigment Violet-19, 23

C.I. Pigment Blue-15:1, 15:3, 15:4, 18, 60, 27, 29

C.I. Pigment Green-7, 36

C.I. Pigment White-6, 18, 21

C.I. Pigment Black-7

It is also preferred to employ white inks to enhance masking of color in the transparent substrate, such as plastic film. Specifically, in soft package printing and label printing, the use of white inks is preferred but the ejection amount becomes larger so that its use is limited in terms of ejection stability and occurrence of curling or wrinkling of recording material.

Pigments described above can be dispersed using, for example, a ball mill, sand mill, atreiter, roll mill, agitator, Henschel mixer, colloid mill, ultrasonic homogenizer, pearl mill, wet jet mixer or paint shaker. There may be added dispersing agents when dispersing a pigment. Such a dispersing agent preferably is a polymeric dispersing agent and examples of a polymeric dispersing agent include Solsperse series, available from Avecia Co. A dispersing agent or a dispersing aid is incorporated preferably in an amount of from 1 to 50 parts by weight, based on 100 parts by weight of the pigment. There may be used a solvent or polymeric compound as a dispersing medium but the ink composition of this invention preferably contains no solvent to cause a reaction and curing immediately after deposition. A solvent remaining in a cured image produces problems such as deteriorated solvent resistance and VOC of the residual solvent. Polymeric compounds, rather than solvents are preferably used as a dispersing medium and in terms of dispersing suitability, it is preferred to choose monomers exhibiting viscosity as low as possible.

Pigment particles preferably have an average particle size of from 0.08 to 0.5 µm, and pigments, dispersing agents and dispersing medium are to be appropriately chosen and dispersing and filtering conditions are optimized so that the maximum particle size falls within the range from 0.3 to 10.0 µm and preferably from 0.3 to 3.0 µm. This particle size control can inhibit clogging in a head nozzle and maintains ink storage stability, ink transparency and curing sensitivity.

The ink composition of this invention preferably contains coloring material at a concentration of from 1% to 10% by weight of the total ink.

Additives

In addition to the foregoing, the ink composition may further contain various additives. Examples thereof include leveling additives, matting agents, polyester type resins, polyurethane type resins, vinyl type resins, acryl type resins, rubber type resins and waxes to control physical properties of film. Addition of an extremely small amount of solvent is effective to improve contact fitness with a recording medium. In that case, addition within a range causing no problem such as solvent resistance or VOC is effective and the amount is from 0.1% to 5%, and preferably from 0.1% to 3%. A radical-cation hybrid type curable ink is feasible by the combination of a radical-polymerizable monomer and an initiator.

Image Forming Method

Next, there will be described the image forming method of the invention. In the image forming method of this invention, an ink composition is ejected on the surface of a recording material to form an image through an ink jet printing system, followed by exposure to actinic rays such as ultraviolet rays to cure the formed image.

After ink is deposited and exposed to actinic rays to perform curing, the overall ink layer thickness is preferably from 2 to 20 μm. In actinic ray-curing type ink jet recording in the field of screen printing, the overall ink layer thickness exceeds 20 μm under present conditions but in the field of soft package printing in which thin plastic material is used as a recording material, there are produced not only problems such as curling and wrinkling but also problems such that texture or feeling of printing material is wholly altered, making practical use difficult. The overall ink layer thickness means a maximum value of an ink layer thickness. When recorded in an ink jet recording system not only by a single color but also by two-color overprinting (secondary color), three-color overprinting and four-color overprinting (white ink base), meaning of the overall ink layer thickness is the same.

With regard to ink ejection conditions, it is preferred to eject ink with heating a recording head and ink at 35° to 100° C., in terms of ejection stability. Actinic ray-curing type inks exhibit rather large variation in viscosity, caused by temperature variation, which greatly affects the droplet size and the droplet ejection speed, causing image deterioration so that it is necessary to maintain an ink at a given temperature, while heating the ink. The ink temperature is maintained at a temperature of setting temperature ±5° C., preferably setting temperature ±2° C., and more preferably setting temperature ±1° C.

The volume of a droplet ejected from the individual nozzle is preferably from 2 to 15 pl. To form precise images, the droplet volume needs to be fallen within the foregoing range but when ejected at this droplet volume, ejection stability becomes severe. According to the invention, even when ejected at a relatively low droplet volume of 2 to 15 pl, ejection stability is enhanced, achieving stable formation of high precise images.

In the image recording method of the invention, preferred conditions for exposure to actinic rays, for example, are to start exposure to an actinic ray within 0.01 to 2.0 sec. (more preferably within 0.001 to 1.0 sec.) after deposition of ink. To form high definition images, the timing of exposure is preferably as soon as possible.

The basic method of exposure to actinic rays is disclosed in JP-A No. 60-132767. Thus, light sources are provided on both sides of a recording head unit and the recording head and the light sources are scanned by a shuttle system. Light exposure is started at an interval after ink deposition. Curing is completed by another undriven light source. U.S. Pat. No. 6,145,979 discloses an exposure method using fiberoptics and a method in which collimated light is irradiated onto a mirror provided on the side of a recording head unit to expose the recording portion to UV rays. Any of these exposure methods is applicable to the image forming method of this invention.

Exposure to actinic rays is divided into several steps. In one preferred embodiment, first, deposited ink is exposed to actinic rays within a period of 0.001 to 2.0 sec. after ink deposition, according to the methods described above and after completion of the whole printing, exposure to actinic rays is further carried out. Dividing exposure to actinic rays into two steps enables to minimize shrinkage of recording material, typically caused while ink is cured.

In conventional UV ink jet systems, there have been used high intensity light sources exceeding a total electric power consumption of 1 kW.hr to prevent expansion or bleeding of dots after ink deposition. However, it is the present status that the use of such a light source results in extraordinarily large shrinkage, specifically in printing onto a shrink label so that it is not acceptable in practice. In the invention, the total electric power consumption of a light source emitting actinic rays is preferably less than 1 kW.hr. Examples of such a light source of a total electric power consumption of less than 1 kw.hr include a fluorescent tube, a cold cathode tube and LED, but are not limited to these. The total electric power consumption is the sum of the power necessitated in driving a light source and exposure. According to the invention, ink jet recording which enables to stably record highly precise images of superior character quality without causing color mixing, becomes feasible even at a relatively low electric power as above.

Printing Matter

In one embodiment of the invention, printing matter is prepared on a non-absorptive recording material using the image forming method of the invention or an image forming apparatus, as described later. The expression, non-absorptive means not absorbing an ink composition (or simply called an ink). In the invention, a recording material exhibiting an ink transfer amount in the Bristow method of less than 0.1 ml/mm$^2$ or substantially 0 ml/mm$^2$ is defined as a non-absorptive recording material.

Bristow Method

The Bristow method is a method for measuring liquid absorption behavior of paper or paper board over a short period of time. Thus, measurement is conducted in accordance with J. TAPPI, Paper and Pulp Testing Method No. 51-87, Liquid absorptivity testing method (Bristow method) and it is represented by an ink transfer amount over a contact time of 40 msec. In the measurement, pure water (deionized water) is used but to make it easy to distinguish the measurement area, a water-soluble dye of less than 2% may be incorporated.

A specific example of the measurement is described below. The ink transfer amount is determined in such a manner that after a recording medium is allowed to stand for 12 hr. under an environment of 25° C. and 50% RH, the measurement is made using Bristow Tester type II (pressure type) as a liquid dynamic absorption testing machine (produced by Kumagaya Riki-kogyo Co., Ltd.). To enhance measurement precision, commercially available water-based ink jet inks (for example, magenta ink) are employed as liquid used for measurement. The ink transfer amount can be determined by measuring an area of the magenta-dyed portion after a prescribed contact time.

As non-absorptive recording material are usable various kinds of non-absorptive plastics and their films as well as conventional non-coated paper and coated paper. Examples of plastic film include PET film, OPS film, OPP film, ONy film, PVC film, PE film, and TAC film. Other plastics include polycarbonate, acryl resin, ABS, polyacetal, PVA, and various rubbers. Further, metals and glass are also feasible. When images are formed on thermally shrinkable PET film, OPS film, OPP film, ONy film or PVC film, the constitution of this invention is effective. These substrates easily curl or deform at the time of curing shrinkage or curing reaction of the ink and it is difficult for the ink layer to follow shrinkage of the substrate.

Various kinds of plastic films greatly differ in surface energy, resulting in problems arising from dot size change after deposition. This invention is applicable not only to plastic film exhibiting a relative low surface energy such as OPP film and OPS film but also to PET film exhibiting a relatively high surface energy, and a substrate exhibiting a wet index of 40 to 60 mN/m is preferred.

In the invention, a long-roll (web) recording material is advantageously used in terms of cost of the recording material such as packaging cost or production cost and print making efficiency.

Recording Apparatus

Recording apparatuses usable in the invention will be described with reference to drawings. Recording apparatuses shown in the drawings are included in embodiments of the invention but the recording apparatuses usable in the invention are not limited to these.

Figure 1:
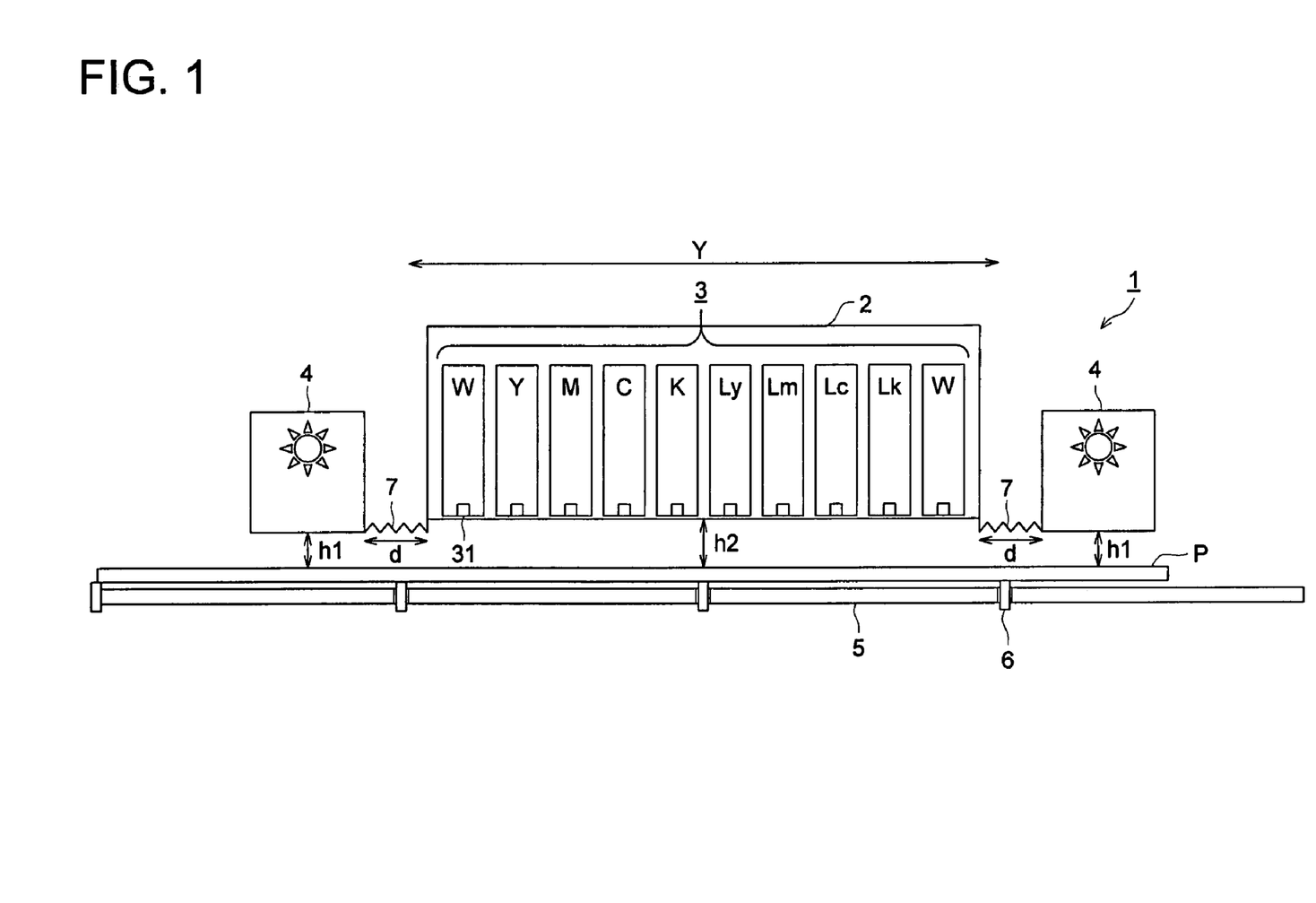
FIG. 1 is a front view of constitution of the main part of a recoding apparatus used in the invention.

FIG. 1 is a front view of the main portion of the recoding apparatus relating to the invention. Recording apparatus (1) is provided with a head carriage (2), a recording head (3), an exposure means (4) and a platen portion (5). In the recording apparatus (1), the platen portion (5) is provided below recording material (P) The platen portion (5) has a function of absorbing ultraviolet rays having passed through the recording material (P). As a result, highly precise images can stably be reproduced.

The recording material (P) is guided to a guide member (6) and moved from the front to the inner section by actuation of a transporting means (which is not shown in the figure). A head scanning means (which is also not shown in the figure) allows the head carriage (2) to reciprocating in the direction of Y, as shown in FIG. 1 to perform scanning of the recording head (3) held in the head carriage (2).

The head carriage (2) is placed over the recording material (P) to house plural recording heads (3) in an ejection opening (31)-downward fashion, in accordance with the number of colors used for image printing on the recording material (P). The head carriage (2) is installed within the body of the recording apparatus (1) in the form capable of reciprocating in the direction of Y of FIG. 1 and reciprocates in the direction of Y by driving the head scanning means.

FIG. 1 is illustrated as the head carriage (2) housing recording heads (3) of white (W), yellow (Y), magenta (M), cyan (C), black (K), light yellow (K), light magenta (Lm), light cyan (Lc), light black (Lk) and white (W) but the color number of recording heads (3) housed in the head carriage (2) is appropriately decided in practice.

The recording head (3) ejects an actinic ray-curable ink (for example, UV-curable ink) supplied by an ink supplying means (not shown in the figure) from the ejection opening toward the recording material (P) by actuation of plural ejecting means (not shown in the figure) installed in the interior. UV ink ejected from the recording head (3) is composed of a polymerizable monomer, photopolymerization initiator and the like, having a property of performing curing through cross-linking and polymerization reaction of the cation-polymerizable monomer along with the photopolymerization initiator generating an acid upon exposure to ultraviolet rays.

The recording head (3) ejects UV ink as ink droplets toward a prescribed area (deposition region) during scanning of moving from one end of the recording material (P) to the other end of the recording material (P) in the direction of Y of FIG. 1 by driving a head scanning means to allow the ink droplets to be deposited onto the deposition region.

After the above-described scanning is repeated optimal times to deposit UV ink toward the deposit region, the recording material (p) is moved in the direction from the front to the inner of FIG. 1 by a transporting means and the recording head (3) performs ejection of UV ink toward the subsequent deposit region adjacent to the foregoing deposit region in the inner direction, while performing scanning by a head scanning means. The foregoing operation is repeated and UV ink is ejected from the recording head (3) interlocking with the head scanning means and transporting means to form an image comprised of an aggregation of UV ink droplets on the recording material (P).

The exposure means (4) is constituted of an ultraviolet lamp emitting ultraviolet rays of specific wavelengths at a stable exposure energy and a filter transmitting ultraviolet rays of a specific wavelength. Examples of an ultraviolet lamp include a mercury lamp, a metal halide lamp, an excimer laser, an ultraviolet laser, a cold cathode tube, a black light and LED (light emitting diode). Of these, the metal halide lamp, cold cathode tube and mercury lamp are preferred.

The exposure means (4) has a shape nearly equivalent to the largest one possible by a recording apparatus (1), for example, UV ink jet printer, of the respective deposit regions of UV ink ejected while the recording head (3) undergoes a single scanning by driving of the head scanning means, or a shape larger than the deposit regions.

The exposure means (4) is fixed at both ends of the head carriage (2) and nearly parallel to the recording material (P).

To adjust illuminance at the ink ejection opening, it is obvious that the recording head (3) is wholly shielded from light but it is also effective to make the distance (h2) between the ink ejection opening (31) of the recording head (3) and the recording material (P) longer than a distance (h1) between the exposure means (4) and the recording material (P), i.e., h1<h2, or to separate a distance (d) between the recording head (3) and the exposure means (4), i.e., increasing "d". It is further preferred to provide a bellows structure (7) between the recording head (3) and the exposure means (4).

The wavelength of an ultraviolet ray emitted from the exposure means (4) can be varied by changing the ultraviolet lamp or filter installed in the exposure means (4).

Figure 2:
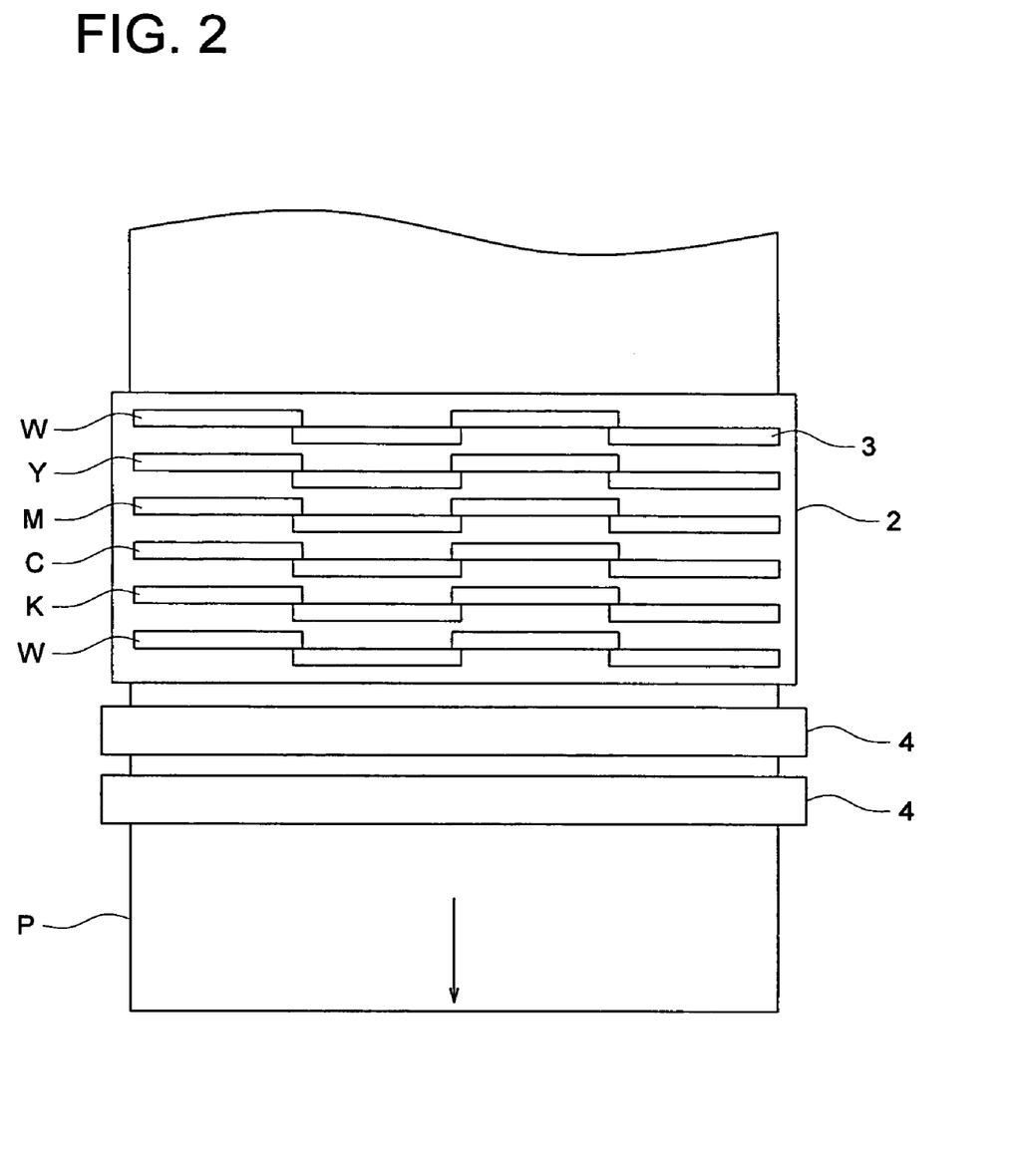
FIG. 2 is a top view of another constitution of the main part of a recoding apparatus used in the invention.

FIG. 2 is a top view of another constitution of the main part of a recoding apparatus usable in the invention, in which the recording material is transported in the direction of the arrow.

Not only conventional non-coated paper and coated paper but also various kinds of non-absorptive plastics and their films are usable as recording material. Examples of plastic film include PET (polyethylene terephthalate) film, OPS (oriented polystyrene) film, OPP (oriented polypropylene) film, ONy (oriented nylon) film, PVC (polyvinyl chloride) film, PE (polyethylene) film and TAC (triacetate) film. There are also usable other plastic such as polycarbonate, acryl resin, ABS, polyacetal, PVA and rubbers. Metals and glass are also applicable. Of these recording materials, when forming images on shrinkable PET film, OPS film, OPP film, ONy film or PVC film, advantageous effects of the invention become more available. These substrate materials are easy to cause curling or deformation of film, due to curing shrinkage of ink and heat generation during the curing reaction and the formed ink film is also difficult to follow shrinkage of the substrate material.

In the invention, a long-roll (web) recording material is advantageously used in terms of cost of the recording material such as packaging cost or production cost and print making efficiency.

EXAMPLES

The present invention will be further described based on examples but embodiment of the invention is not limited to these.

Example 1

Preparation of Actinic Ray Curable Composition

There were prepared actinic ray curable compositions in which photopolymerizable compounds, photopolymerizatin initiators (photolytically acid-generating agents), oxetane compounds, epoxy compounds and other additives are incorporated as shown in Table 1.

The respective materials shown in Table 1 are as follows:

Photopolymerizable Compound:
  OXT101: compound containing one oxetane ring (produced by TOAGOSEI CO., LTD.),
  OXT212: compound containing one oxetane ring (produced by TOAGOSEI CO., LTD.),
  OXT221: compound containing two oxetane ring (produced by TOAGOSEI CO., LTD.),
  E1:Celloboxide 2021P (produced by DAICEL CHEMICAL INDUSTRIES, LTD.), alicyclic epoxy compound
  E4030: Sansocizer E-4030 (produced by Shin-nippon Rika Co.) epoxidized fatty acid ester Photolytically Acid-generating Agent:
  UVI6992: 50% propiocarbonate solution (produced by Dow Chemical Corp.)
  1: triisopropanolamine (basic compound)
  2: tributylamine (basic compound).

TABLE 1

| Sample No. | Oxetane Compd. (O-2) | Oxetane Compd. (O-1) | | Alicyclic Epoxy Compound | Epoxidized Fatty Acid Ester | Photopolymerization Initiator | Basic Compound | Remark |
|---|---|---|---|---|---|---|---|---|
| 1 | OXT221 (65) | — | — | *E1(29.5) | — | UVI(5) | *1(0.5) | Comp. |
| 2 | OXT221 (65) | — | — | *E1(29.5) | — | S-5(5) | *1(0.5) | Comp. |
| 3 | OXT221 (40) | OXT101 (10) | OXT212 (15) | *E1(29.5) | — | S-5(5) | *1(0.5) | Comp. |
| 4 | OXT221 (50) | OXT101 (8) | OXT212 (7) | *E1(29.5) | — | S-5(5) | *1(0.5) | Inv. |
| 5 | OXT221 (55) | OXT101 (5) | OXT212 (5) | *E1(29.5) | — | S-5(5) | *1(0.5) | Inv. |
| 6 | OXT221 (57) | OXT101 (3) | OXT212 (5) | *E1(29.5) | — | S-5(5) | *1(0.5) | Inv. |
| 7 | OXT221 (47) | OXT101 (3) | OXT212 (5) | *E1(29.5) | E4030(10) | S-5(5) | *1(0.5) | Inv. |
| 8 | OXT221 (52) | OXT101 (3) | OXT212 (5) | *E1(29.5) | E4030(5) | S-5(5) | *1(0.5) | Inv. |
| 9 | OXT221 (65) | — | — | EP-1 (29.5) | — | UVI(5) | *2(0.5) | Comp. |
| 10 | OXT221 (65) | — | — | EP-1 (29.5) | — | I-3(5) | *2(0.5) | Comp. |
| 11 | OXT221 (40) | OXT101 (10) | OXT212 (15) | EP-1 (29.5) | — | I-3(5) | *2(0.5) | Comp. |
| 12 | OXT221 (55) | OXT101 (3) | OXT212 (7) | EP-1 (29.5) | — | I-3(5) | *2(0.5) | Inv. |
| 13 | OXT221 (45) | OXT101 (3) | OXT212 (7) | EP-1 (29.5) | E4030(10) | I-3(5) | *2(0.5) | Inv. |
| 14 | OXT221 (50) | OXT101 (3) | OXT212 (7) | EP-1 (29.5) | E4030(5) | I-3(5) | *2(0.5) | Inv. |
| 15 | OXT221 (50) | OXT101 (3) | OXT212 (7) | EP-8 (29.5) | E4030(5) | S-10(5) | *2(0.5) | Inv. |
| 16 | OXT221 (65) | — | — | EP-15 (29.5) | — | S-10(5) | *2(0.5) | Comp. |
| 17 | OXT221 (50) | OXT101 (3) | OXT212 (7) | EP-15 (29.5) | E4030(5) | S-10(5) | *2(0.5) | Inv. |
| 18 | E-1 (65) | — | — | EP-15 (29.5) | — | S-13(5) | *1(0.5) | Comp. |
| 19 | E-1 (40) | OXT101 (10) | OXT212 (15) | EP-15 (29.5) | — | S-13(5) | *1(0.5) | Comp. |
| 20 | E-1 (55) | OXT101 (3) | OXT212 (7) | EP-15 (29.5) | — | S-13(5) | *1(0.5) | Inv. |
| 21 | *O(50) | OXT101 (3) | OXT212 (7) | EP-15 (29.5) | E4030(5) | S-13(5) | *1(0.5) | Inv. |

Numerals in parenthesis indicate percentage by weight.

Evaluation of Curing Sensitivity

The obtained actinic ray curable composition was coated at a thickness of 3 μm on synthetic paper (YUPO FGS, produced by YUPO Corp.) and exposed to ultraviolet light with varying the amount of light. After exposure, the cured coated film was rubbed with a fingernail and whether the film was peeled or not was observed to judge curing quality. The curing sensitivity was represented by the minimum ultraviolet amount (mJ/cm$^2$) capable of preventing film peeling.

Curing of Actinic Ray Curable Composition

Coat film was formed and cured in the following manner. Thus, the actinic ray curable compositions were each coated at a thickness of 3 μm on synthetic paper (YUPO FGS, produced by YUPO Corp.) and exposed to ultraviolet rays at 300 mJ/cm$^2$ within 1 sec. using a metal halide lamp to obtain cured material.

Measurement of Viscosity

Viscosity was measured at a temperature of 25° C. and a shearing rate of 10001/s.

Evaluation of Cured Material

The cured materials were evaluated with respect to physical properties, according to the following procedure.

Flexibility

The respective actinic ray curable compositions were coated to a thickness of 80 μm on synthetic paper (YUPO FGS, produced by YUPO Corp.) and exposed 0.1 sec. after deposition at an exposure amount of 180 mW/cm$^2$, using a hot cathode tube (produced by Nippo Corp., a custom-made product) and 200 W power source to obtain cured materials. The obtained cured material samples were evaluated with respect to flexibility of the cured material film according to the method of flexibility test defined in JIS K 5600. Each sample was wounded around cylindrical rods differing in diameter in a printed surface-outward fashion. The flexibility was represented by the minimum diameter of cylinders on which no cracking occurred. The less value indicates superior flexibility.

Pencil Scratch Test

Each cured material was measured with respect to hardness according to the pencil scratch test defined in JIS K 5400. The hardness was represented by nominal pencil hardness.

Sticking Rate

A piece of adhesive tape (Scotch #250, produced by Sumitomo 3M Co.) was pressed onto each of the cured material samples obtained in the cross cut test of JIS K 5400 and tightly adhered with a roller of 2 kg by back and forth motion, thereafter, the tape was peeled off in one testing session and the number of cross cut-form residue was measured to determine residual sticking rate.

Results are shown in Table 2.

TABLE 2

| Sample No. | Pencil Scratch Hardness | Sticking Residue Rate (%) | Flexibility Rank | Curing Sensitivity (mJ/cm$^2$) | Viscosity (mPa·s) | Remark |
| --- | --- | --- | --- | --- | --- | --- |
| 1 | 2H | 40 | *1 | 120 | 18 | Comp. |
| 2 | 2H | 40 | *1 | 100 | 18 | Comp. |
| 3 | 2B | 30 | 1 mm φ | 600 | 24 | Comp. |
| 4 | HB | 70 | 4 mm φ | 200 | 20 | Inv. |
| 5 | H | 80 | 3 mm φ | 120 | 19 | Inv. |
| 6 | H | 85 | 3 mm φ | 100 | 19 | Inv. |
| 7 | H | 85 | 1 mm φ | 100 | 18 | Inv. |
| 8 | H | 90 | 1 mm φ | 97 | 19 | Inv. |
| 9 | 2H | 60 | 10 mm φ | 70 | 25 | Comp. |
| 10 | 2H | 60 | 10 mm φ | 65 | 25 | Comp. |
| 11 | 2B | 35 | 1 mm φ | 400 | 30 | Comp. |
| 12 | H | 80 | 4 mm φ | 70 | 25 | Inv. |
| 13 | H | 85 | 1 mm φ | 68 | 22 | Inv. |
| 14 | H | 90 | 2 mm φ | 70 | 23 | Inv. |
| 15 | H | 90 | 2 mm φ | 72 | 23 | Inv. |
| 16 | 2H | 60 | 10 mm φ | 68 | 30 | Comp. |
| 17 | H | 90 | 1 mm φ | 70 | 23 | Inv. |
| 18 | 2H | 70 | 10 mm φ | 60 | 30 | Comp. |
| 19 | 2H | 30 | 1 mm φ | 350 | 35 | Comp. |
| 20 | H | 95 | 2 mm φ | 65 | 31 | Inv. |
| 21 | H | 95 | 1 mm φ | 65 | 30 | Inv. |

*1: cracking occurred even at 10 mm φ.

As apparent from Table 2, it was proved that the inventive samples formed cured film exhibiting superior strength and flexibility without lowering sensitivity.

Example 2

Preparation of Actinic Ray Curable Ink

Into a 5 lit. stainless steel beaker were added 5 parts by weight of a dispersing agent (PB822, produced by Ajinomoto Fine-Techno Corp.) and photopolymerizable compounds shown in Table 3, and mixed and dissolved over 1 hr., while stirring with heating on a hot plate of 65° C. Subsequently, a pigment corresponding the respective colors was added to the solution obtained above and put into a plastic bottle together with 200 g of zirconia beads of 1 mm diameter, sealed and dispersed over 2 hr. using a paint shaker. Then, the zirconia beads were removed and thereto, additives such as a photopolymerization initiator, acid generating agent, basic compound and a silicone surfactant were added in the combination, as shown in Table 3 and then filtered through a 0.8 μm membrane filter for prevention of clogging in a printer. A set of ink compositions was thus prepared. The ink viscosity was controlled to the range of 20 to 30 mPa·s by adjusting addition amounts of oxetane ring-containing compounds and epoxy compounds.

TABLE 3

| Sample No. | Photopolymerizable Compound | | | | | Photo­polymerization Initiator | Basic Compound |
| --- | --- | --- | --- | --- | --- | --- | --- |
| | Oxetane Compd. (O-2) | Oxetane Compd. (O-1) | | Epoxy compd. | | | |
| 1 | OXT221 (65) | — | — | *E1 (22.65) | — | UVI6992 (5) | *2 (1) |
| 2 | OXT221 (40) | OXT101 (10) | OXT212 (15) | *E1 (22.65) | — | UVI6992 (5) | *2 (1) |
| 3 | OXT221 (50) | OXT101 (8) | OXT212 (7) | *E1 (22.65) | — | S-5 (5) | *2 (1) |

TABLE 3-continued

| | | | | | | | |
|---|---|---|---|---|---|---|---|
| 4 | OXT221 (45) | OXT101 (3) | OXT212 (7) | *E1 (22.65) | E4030 (10) | S-5 (5) | *2 (1) |
| 5 | OXT221 (50) | OXT101 (3) | OXT212 (7) | *E1 (22.65) | E4030 (5) | S-5 (5) | *2 (1) |
| 6 | OXT221 (65) | — | — | EP-1 (22.65) | — | I-3 (5) | *2 (1) |
| 7 | OXT221 (40) | OXT101 (10) | OXT212 (15) | EP-1 (22.65) | — | I-3 (5) | *2 (1) |
| 8 | OXT221 (50) | OXT101 (3) | OXT212 (7) | EP-1 (27.65) | — | I-3 (5) | *2 (1) |
| 9 | OXT221 (50) | OXT101 (3) | OXT212 (7) | EP-1 (22.65) | E4030 (5) | I-3 (5) | *2 (1) |
| 10 | E-1 (50) | — | — | EP-8 (37.65) | — | S-10 (5) | *1 (1) |
| 11 | E-1 (50) | OXT101 (3) | OXT212 (7) | EP-8 (27.65) | — | S-10 (5) | *1 (1) |
| 12 | E-1 (50) | OXT101 (3) | OXT212 (7) | EP-8 (22.65) | E4030 (5) | S-10 (5) | *1 (1) |

| Sample No. | Perfume | Deodorizer | Surfactant | Dispersant | Pigment | Others | | Remark |
|---|---|---|---|---|---|---|---|---|
| 1 | *3 (0.05) | *5 (1) | XF42-334 (0.1) | PB822 (1) | Dye (3) | *4 (0.2) | Water (1) | Comp. |
| 2 | *3 (0.05) | *5 (1) | XF42-334 (0.1) | PB822 (1) | Dye (3) | *4 (0.2) | Water (1) | Comp. |
| 3 | *3 (0.05) | *5 (1) | XF42-334 (0.1) | PB822 (1) | Dye (3) | *4 (0.2) | Water (1) | Inv. |
| 4 | *3 (0.05) | *5 (1) | XF42-334 (0.1) | PB822 (1) | Dye (3) | *4 (0.2) | Water (1) | Inv. |
| 5 | *3 (0.05) | *5 (1) | XF42-334 (0.1) | PB822 (1) | Dye (3) | *4 (0.2) | Water (1) | Inv. |
| 6 | *3 (0.05) | *5 (1) | XF42-334 (0.1) | PB822 (1) | Dye (3) | *4 (0.2) | Water (1) | Comp. |
| 7 | *3 (0.05) | *5 (1) | XF42-334 (0.1) | PB822 (1) | Dye (3) | *4 (0.2) | Water (1) | Comp. |
| 8 | *3 (0.05) | *5 (1) | XF42-334 (0.1) | PB822 (1) | Dye (3) | *4 (0.2) | Water (1) | Inv. |
| 9 | *3 (0.05) | *5 (1) | XF42-334 (0.1) | PB822 (1) | Dye (3) | *4 (0.2) | Water (1) | Inv. |
| 10 | *3 (0.05) | *5 (1) | XF42-334 (0.1) | PB822 (1) | Dye (3) | *4 (0.2) | Water (1) | Comp. |
| 11 | *3 (0.05) | *5 (1) | XF42-334 (0.1) | PB822 (1) | Dye (3) | *4 (0.2) | Water (1) | Inv. |
| 12 | *3 (0.05) | *5 (1) | XF42-334 (0.1) | PB822 (1) | Dye (3) | *4 (0.2) | Water (1) | Inv. |

Numerals in parenthesis indicate percentage by weight.

The additives shown in Table 3 are as follows:

*3: mint perfume (Mint THP-8148 (produced by Hasegawa Koryo Co.)

4: Sumilizer MDP-S [produced by SUMITOMO CHEMICAL COL., LTD, 2,2-methylenebis-(4-methyl-6-tert-butylphenol)]

5: Deodorizer (Yuko Delsen, produced by Yuko Yakuhin Co., Ltd.)

XF42-334: silicone oil, produced by GE Toshiba Silicone Co., Ltd.

PB822: product by Ajinomoto Fine-techno Co.

Pigment of individual color

K: CI pigment Black 7
C: CI pigment Blue 15:3
M: CI pigment Red 571
Y: CI pigment Yellow 13
W: titanium oxide (anatase type, particle size of 0.2 μm)
Lk: CI pigment Black 7
Lm: CI pigment Red 57:1
Ly: CI pigment Yellow 13

The content of a light color pigment (Lk, Lm or Ly) was reduced to ⅕ and the content of a compound containing two oxetane rings was increased to adjust the whole weight percentage.

Ink Jet Imaging Process

Each of the actinic ray curable inks described above was loaded into an ink jet recording apparatus provided with a piezo type ink jet nozzle and comprised of constitution shown in FIG. 1 and image recording was continuously performed on a recording material of 600 mm width and 20 m length. The ink supply system was composed of an ink tank, a supply pipe, a pre-roomed ink tank just in front of the head, a pipeline with a filter and a piezo head. The portion of from the pre-roomed tank to the head was insulated and heated at 50° C. The head was heated in accordance with the viscosity of the actinic ray curable ink and the foregoing actinic ray curable ink was continuously ejected by driving the head so that multi-sized dots of a droplet amount of 2 to 15 pl were ejected at a resolution of 720×720 dpi (dpi: number of dots per inch or 2.54 cm). Recording material was heated at 40° C. using a plate heater. After deposition of ink droplets, exposure of 180 mW/cm$^2$ was conducted using a light source of hot cathode tubes (produced by Nippo Corp., custom-made product) with a 200 W power source, provided on both ends of the carriage to perform nearly instantaneous curing (less than 0.5 sec. after deposition). After completion of image recording, the total ink layer thickness was determined to be in the range of 2 to 60 μm. According to the foregoing procedure, printing was conducted under environment (1) of 30° C. and 80% RH or environment (2) of 25° C. and 20% RH to form an ink jet image.

The illuminance of the individual exposure light source was measured with respect to integrated illuminance at 254 nm, using UVPF-A1 (produced by Iwasaki Denki Co., Ltd.).

Details of abbreviated names of recording materials described above are as follows:

synthetic paper: synthetic paper YUPO FGS, produced by YUPO corp.
PVC: polyvinyl chloride Evaluation of Ink Ejectability After ink was continuously ejected over 30 min., the situation of blank ink areas was visually observed and evaluated based on the following criteria:
A: no black areas were observed and it is superior level,
B: few blank areas were observed at level rated as no problem,
C: blank areas were observed at a level which adversely affected image quality,
D: marked blank areas were observed, rated as an unacceptable level.

Evaluation of Color Mixing

Printing was performed at 720 dpi for each of Y, M, C and K colors so that dots were arranged adjacent to each other and the adjacent dots were observed by a magnifier with respect to bleeding and wrinkling and evaluated based on the following criteria:
A: adjacent dots were remained as distinct circles and no bleeding was observed,
B: adjacent dots were nearly circular and bleeding was barely observed,
C: adjacent dots bled slightly and were deformed but at an acceptable practical level of quality,
D: adjacent dots bled and mixed together, causing wrinkling at overlapping portions and considered as unacceptable in practice.

Evaluation of quality of printed letter image Using each of inks of Y, M, C and K colors, letters (Ming-style type of 6-point) were printed at an objective density, observed by a magnifier and evaluated with respect to roughening of letter images, based on the following criteria. Printing was continuously conducted over 100 m of recording material and evaluation of image quality was done at the points of 1 mm, 10 m and 100.
A: no roughening was observed,
B: slightly roughening was observed
C: roughening was observed but discernable as letter and acceptable in practice,
D: roughening was marked, and printed letters were hazy and unacceptable in practice.

Results are shown in Table 4.

TABLE 4

| Sample No. | 30° C. 80% RH | | | | 25° C. 20% RH | | | | Flexibility | Pencil Scratch hardness | Sticking Residue Rate (%) | Ejectability | Remark |
| | PVC | | YUPO FGS | | PVC | | YUPO FGS | | | | | | |
| | *1 | *2 | *1 | *2 | *1 | *2 | *1 | *2 | | | | | |
| 1 | C | C | C | C | B | C | B | C | *3 | 2H | 40 | A | Comp. |
| 2 | D | D | D | D | B | B | B | B | 1 mm φ | 2B | 30 | A | Comp. |
| 3 | B | B | B | B | A | A | A | A | 4 mm φ | HB | 70 | A | Inv. |
| 4 | A | A | A | A | A | A | A | A | 1 mm φ | H | 84 | A | Inv. |
| 5 | A | A | A | A | A | A | A | A | 1 mm φ | H | 89 | A | Inv. |
| 6 | C | C | C | C | B | B | C | C | 1 mm φ | 2H | 58 | A | Comp. |
| 7 | C | C | D | D | B | B | B | B | 1 mm φ | 2B | 34 | A | Comp. |
| 8 | B | B | B | B | B | B | B | B | 3 mm φ | H | 81 | A | Inv. |
| 9 | A | A | A | A | A | A | A | A | 1 mm φ | H | 92 | A | Inv. |
| 10 | C | C | C | C | B | B | B | B | 10 mm φ | 2H | 65 | A | Comp. |
| 11 | A | A | A | A | A | A | A | A | 3 mm φ | H | 93 | A | Inv. |
| 12 | A | A | A | A | A | A | A | A | 1 mm φ | H | 96 | A | Inv. |

*1: Bleeding
*2: Letter
*3: cracking occurred even at 10 mm φ.

As can be seen from the results of Table 4, it was proved that the inventive samples resulted in no deterioration in ejectability and image quality, exhibiting superior film strength and flexibility. It was further proved that the inventive samples achieved superior performance, not depending on environments.

What is claimed is:

1. An actinic ray curable composition comprising an oxetane ring-containing compound and an epoxy compound, the oxetane ring-containing compound comprising a compound (0-1) containing a single oxetane ring and a compound (0-2) containing at least two oxetane rings, and the compound (0-1) accounting for 1% to 10% by weight of the composition.

2. The actinic ray curable composition of claim 1, wherein the compound (0-1) and the compound (0-2) are represented by the following formulas (Ox-1) and (Ox-2), respectively:

formula (Ox-1)

wherein $R^1$ to $R^6$ are each a hydrogen atom or a substituent, provided that at least one of $R^3$ to $R^6$ is a substituent;

formula (Ox-2)

wherein $R^{11}$ to $R^{16}$ are each a hydrogen atom or a substituent, provided that one of $R^{13}$ to $R^{16}$ is a single bond; n0 is an integer of 2 or more; and L is a n0-valent linkage group.

3. The actinic ray curable composition of claim 2, wherein at least one of the compound (0-1) and the compound (0-2) contains a substituent at 2-position of an oxetane ring.

4. The actinic ray curable composition of claim 1, wherein the epoxy compound is an alicyclic epoxy compound.

5. The actinic ray curable composition of claim 4, wherein the alicyclic epoxy compound is represented by the following formula (A):

formula (A)

wherein $R_{100}$ and $R_{110}$ are each a substituent; m01 and m02 are each an integer of 0 to 2; r0 is an integer of 1 to 3; $L_0$ is a (r0+1)-valent linkage group having 1 to 15 carbon atoms or a single bond.

6. The actinic ray curable composition of claim 5, wherein the alicyclic epoxy compound of formula (A) is at least one of compounds represented by the following formulas (I), (II), (III) and (IV):

formula (I)

wherein $R_{101}$ and $R_{111}$ are each a substituent; m11 and m12 are each an integer of 0 to 2, and r1 is an integer of 1 to 3; $L_1$ is a (r1+1)-valent linkage group having 1 to 15 carbon atoms or a single bond;

formula (II)

wherein $R_{102}$ and $R_{112}$ are each a substituent; m21 and m22 are each an integer of 0 to 2, and r2 is an integer of 1 to 3; $L_2$ is a (r2+1)-valent linkage group having 1 to 15 carbon atoms or a single bond;

formula (III)

wherein $R_{200}$ and $R_{210}$ are each an aliphatic group locating at a position other than α- or β-position of an oxirane ring; m31 and m32 are each an integer of 0 to 2; $X_1$ and $X_{11}$ are each —$(CH_2)_{n0}$— or —$(O)_{n0}$— in which n0 is 0 or 1; p1 and q1 are each 0 or 1, provided that p1 and q1 are not 0 at the same time; r3 is an integer of 1 to 3; $L_3$ is a (r3+1)-valent linkage group having 1 to 15 carbon atoms or a single bond;

formula (IV)

wherein $R_{201}$ and $R_{211}$ are each an aliphatic group locating at a position other than α- or β-position of an oxirane ring; m41 and m42 are each an integer of 0 to 2; $X_1$ and $X_{11}$ are each —$(CH_2)_{n1}$— or —$(O)_{n1}$— in which n1 is 0 or 1; p2 and q2. are each 0 or 1, provided that p2 and q2 are not 0 at the same time; r4 is an integer of 1 to 3; $L_4$ is a (r4+1)-valent linkage group having 1 to 15 carbon atoms or a single bond.

7. The actinic ray curable composition of claim 1, wherein the epoxy compound is an epoxidized fatty acid ester.

8. The actinic ray curable composition of claim 1, wherein the epoxy compound is an epoxidized fatty acid glyceride.

9. The actinic ray curable composition of claim 1, wherein the composition further comprises a photolytically acid-generating agent.

10. The actinic ray curable composition of claim 9, wherein the photolytically acid-generating agent is an onium salt.

11. The actinic ray curable composition of claim 10, wherein the onium salt is an iodonium salt or a sulfonium salt.

12. The actinic ray curable composition of claim 11, wherein the sulfonium salt is at least one of sulfonium salts represented by the following formulas (1) to (4):

formula (1)

wherein $R_1$ to $R_{17}$ are each a hydrogen atom or a substituent, provided that $R_1$ to $R_3$ are not hydrogen atoms at the same time, $R_4$ to $R_7$ are not hydrogen atoms at the same time, $R_8$ to $R_{11}$ are not hydrogen atoms at the same time and $R_{12}$ to $R_{17}$ are not hydrogen atoms at the same time; X is non-nucleophilic anion residue.

13. The actinic ray curable composition of claim 1, wherein the composition exhibits a viscosity of 7 to 40 mPa.s at 25° C.

14. An actinic ray curable ink, wherein the ink comprises an actinic ray curable composition as claimed in claim 1 and the composition further comprises a pigment.

15. An image forming method comprising the steps of:
(a) ejecting droplets of an ink through a recording head with at least one nozzle and onto a surface of a recording material and
(b) exposing the recording material with the ink on the surface thereof to an actinic ray to cure the ink, wherein the ink is an actinic ray curable ink, as claimed in claim 14.

16. The image forming method of claim 15, wherein in step (b), the recording material is exposed within 0.001 to 0.1 sec. after ejecting the droplets.

17. The image-forming method of claim 15, wherein in step (a), the ejected droplets each have a volume of 2 to 15 pl.

18. The image forming method of claim 15, wherein in step (a), the droplets are ejected after heating the ink and the recording head at a temperature of 35° to 100° C.

19. The image forming method of claim 15, wherein in step (a), the recording material is maintained at a temperature of 35° to 60° C.

* * * * *